United States Patent [19]
Merrill et al.

[11] Patent Number: 6,011,295
[45] Date of Patent: Jan. 4, 2000

[54] NEURAL NETWORK ACTIVE PIXEL CELL

[75] Inventors: Richard Billings Merrill, Woodside; Albert Bergemont; Min-hwa Chi, both of Palo Alto, all of Calif.

[73] Assignee: Foveonics, Inc., Cupertino, Calif.

[21] Appl. No.: 08/898,062

[22] Filed: Jul. 22, 1997

[51] Int. Cl.[7] .................................................. G06G 7/16
[52] U.S. Cl. ............................ 257/443; 257/88; 257/83; 257/59; 257/72; 257/316; 257/295; 257/319; 257/325; 365/145; 307/201
[58] Field of Search .............................. 257/59, 72, 295, 257/316, 319, 324, 314, 320, 443, 83, 88; 365/145, 183–188; 307/201

[56] References Cited

U.S. PATENT DOCUMENTS

| | | | |
|---|---|---|---|
| 4,988,891 | 1/1991 | Masahiko | 307/201 |
| 5,129,040 | 7/1992 | Hanazato et al. | 307/201 |
| 5,498,888 | 3/1996 | Ozawa | 257/295 |
| 5,680,475 | 10/1997 | Zwierski et al. | 382/156 |

OTHER PUBLICATIONS

Shibata, T. et al., "A Functional MOS Transistor Featuring Gate–Level Weighted Sum and Threshold Operations, " *IEEE Transactons on Electron Devices*, pp. 144–1455, vol. 39. No. 6, Jun. 1992.

Shibata, T. et al., "Neuron MOS Binary–Logic Integrated Circuits—Part I: Design Fundamentals and Soft–Hardware–Logic Circuit Implementation," *IEEE Transactions on Electron Devices*, pp. 570–575, vol. 40. No. 3, Mar. 1993.

Shibata, T. et al., "Neuron MOS Binary–Logic Integrated Circuits—Part II: Simpiflying Techniques of Circuit Configuration and their Practical Applications," *IEEE Transactions on Electron Devices*, pp. 974–979, vol. 40. No. 5, May 1993.

*Primary Examiner*—Fetsum Abraham
*Attorney, Agent, or Firm*—Limbach & Limbach LLP

[57] ABSTRACT

An active pixel image cell which includes a photosensor, active devices for control of the sensor and readout of a signal representing the intensity of light to which the sensor is exposed, and a neuron MOSFET transistor which "both amplifies the signal from the photosensor and" simulates the behavior of a human neuron. An integrated neural network and imaging array may be formed by interconnecting a group of such pixels. Digital signal processing algorithms used for image processing may be implemented at the pixel level by appropriate interconnections between the output signals from the photosensor of surrounding pixels and the neuron MOSFET.

10 Claims, 6 Drawing Sheets output current = f (x K1 + y K2 + z K3)

$y = \{ [(n, m + 1) + (n, m - 1)] / 2 + [(n - 1, m) + (n + 1, m)] / 2 \} / 2$
(2 two dimensional average)
if $(n, m) > 2y$ or $(n, m) < y/2$ then $(n, m) = y$ Neuron transistor with coupling of 1/4 each and connected to all 4 pixels surrounding this pixel.

NEURAL NETWORK ACTIVE PIXEL CELL

TECHNICAL FIELD

The present invention relates to active pixel image cells, and more specifically, to a design for such a cell which includes an embedded transistor capable of simulating the behavior of a neuron. The combined photosensor and neuron element may be interconnected with other similar pixels to form a neural network using the active pixel cells' sensors and neural transistors to provide inputs to the network. The network may be used to perform focal plane level signal processing capable of simulating the imaging and processing capability of the human eye and brain.

BACKGROUND OF THE INVENTION

Charge-coupled devices (CCDs) are used in conventional imaging circuits for converting the light incident on a pixel into an electrical signal that is proportional to the intensity of the incident light. In general, CCDs utilize a photogate to convert the incident photons into an electrical charge, and a series of electrodes to transfer the charge collected at the photogate to an output node.

Although CCDs have many strengths including a high sensitivity and fill-factor, CCDs also suffer from a number of weaknesses. Most notable among these weaknesses, which include limited readout rates and dynamic range limitations, is the difficulty in integrating CCDs with CMOS-based microprocessors.

To overcome the limitations of CCD-based imaging circuits, imaging circuits based on active pixel sensor cells have been developed. In an active pixel sensor cell, a conventional photodiode is combined with a number of active transistors which, in addition to forming an electrical signal representative of the output of the photodiode, provide amplification, readout control, and reset control. Arrays of active pixel sensor cells can be used in multimedia applications requiring low-cost and high functionality to acquire high quality images at video frame rates. Because the elements of an active pixel sensor are fabricated using a CMOS process flow, the sensor may easily be integrated into more complex CMOS-based devices to produce combined sensor-signal processor devices.

FIG. 1 shows an example of a conventional CMOS active pixel sensor cell 10. As shown in the figure, cell 10 includes a photodiode 12 connected to a first intermediate node (labelled "node 1" in the figure), and a reset transistor 14 that has a drain connected to a power supply node $N_{PS}$ a source connected to node 1, and a gate connected to a first input node (labelled "reset" in the figure).

Cell 10 further includes a buffer transistor 16 and a row-select transistor 18. Buffer transistor 16 has a drain connected to node $N_{PS}$, a source connected to a second intermediate node (labelled "node 2" in the figure), and a gate connected to node 1. Row-select transistor 18 has a drain connected to node 2, a source connected to a third intermediate node (where the source line intersects the column data line in the figure), and a gate connected to a second input node (labelled "row select" in the figure).

The operation of cell 10 begins by briefly pulsing the gate of reset transistor 14 with a reset voltage $V_{RESET}$ at time $t_1$. The reset voltage $V_{RESET}$, which is equal to Vcc (typically, +5V), resets the voltage on photodiode 12 to an initial integration voltage and begins an image collection cycle.

At this point, the initial integration voltage on photodiode 12 (as measured at node 1) is defined by the equation $V_{RESET}-V_{T14}-V_{CLOCK}$, where $V_{T14}$ represents the threshold voltage of reset transistor 14, and $V_{CLOCK}$ represents reset noise from the pulsed reset voltage (assumed to be constant). Similarly, the initial integration voltage as measured at node 2 is defined by the equation $V_{RESET}-V_{T14}-V_{CLOCK}-V_{T16}$, where $V_{T16}$ represents the threshold voltage of buffer transistor 16 (functioning as a source follower).

After the reset voltage $V_{RESET}$ has been pulsed and the voltage on photodiode 12 (as measured at node 1) has been reset, a row-select voltage $V_{RS}$ is applied to the second input node (row select) at a time $t_2$ which immediately follows the falling edge of the reset pulse $V_{RESET}$. The row select voltage $V_{RS}$ causes the voltage on node 2, which represents the initial integration voltage of the cycle, to appear on the third intermediate node (where the source of row select transistor 18 intersects the column data line). Detection and calculation circuit 20 connected to the column data line then amplifies, digitizes, and stores the value of the initial integration voltage as it appears on the third intermediate node.

Next, from time $t_2$, which represents the beginning of the image collection cycle, to a time $t_3$, which represents the end of the image collection cycle, light energy, in the form of photons, strikes photodiode 12, thereby creating a number of electron-hole pairs. Photodiode 12 is designed to limit recombination between the newly formed electron-hole pairs. As a result, the photogenerated holes are attracted to the ground terminal of photodiode 12, while the photogenerated electrons are attracted to the positive terminal of photodiode 12, where each additional electron reduces the voltage on photodiode 12 (as measured at node 1). Thus, at the end of the image collection cycle, a final integration voltage will be present on photodiode 12.

At this point (time $t_3$), the final integration voltage on photodiode 12 (as measured at node 1) is defined by the equation $V_{RESET}-V_{T14}-V_{CLOCK}-V_S$, where $V_S$ represents the change in voltage due to the absorbed photons. Similarly, the final integration voltage as measured at node 2 is defined by the equation $V_{RESET}-V_{T14}-V_{CLOCK}-V_{T16}-V_S$.

At the end of the image collection cycle (time $t_3$), the row-select voltage $V_{RS}$ is again applied to the row select input node. The row select voltage $V_{RS}$ causes the voltage on the second intermediate node, which represents the final integration voltage of the cycle, to appear on the third intermediate node. Detection and calculation circuit 20 then amplifies and digitizes the value of the final integration voltage as it appears on the third intermediate node.

Following this, detection and calculation circuit 20 determines the number of photons that have been collected during the integration cycle by calculating the difference in voltage between the digitized final integration voltage taken at time $t_3$ and the digitized stored initial integration voltage taken at time $t_2$. At this point, the difference is voltage is defined by the equation $(V_{RESET}-V_{T14}-V_{CLOCK}-V_{T16})-(V_{RESET}-V_{T14}-V_{CLOCK}-V_{T16}-V_S)$, thereby yielding the value $V_S$.

Once the final integration voltage has been digitized by the detection and calculation circuit, the reset voltage $V_{RESET}$ is again applied to the first input node at time $t_4$, which immediately follows the rising edge of the row select voltage $V_{RS}$ at time $t_3$. The reset voltage $V_{RESET}$ again resets the voltage on photodiode 12 to begin another image collection cycle.

Image processing is normally performed after the image is captured, converted to a digital format, moved to a main memory, and operated upon by the processing unit, where detection and calculation circuit 20 may be part of the processing unit. Each of these operations requires the consumption of power and can limit the maximum throughput rate for video signals, since the data processing is significantly delayed from the time at which the data is collected. These factors are important for portable imaging applications, which represents a primary area of growth at the present time for active pixel sensors.

FIG. 2 shows a model for a human neuron 100. Neuron 100 has as inputs a set of signals, $V_i$ 112. Neuron 100 performs two primary functions: (1) a weighted summing of the product of input signals 112 and a set of weights $W_i$ 114, producing the expression $\Sigma(V_i W_i)$, to which is added a bias value (b) 116; and (2) a thresholding of the summed value $\Sigma(V_i W_i)+b$ by means of a sigmoid function 118. If the summed value exceeds the threshold value as determined by the sigmoid function, then the neuron "fires", i.e, produces an output signal, $V_o$ 120.

Neural networks composed of interconnected floating gate MOSFETs which implement the human neuron model of FIG. 2 may be constructed and used to implement digital signal processing algorithms for the purpose of processing images. These functions are typically performed on digitized maps of the data gathered by an imaging array in the form of a post-data collection image processing algorithm. However, this approach has several disadvantages. Each of the operations used to prepare the data for processing after collection of the array data requires the consumption of power and can limit the maximum throughput rate. In contrast, image processing at the focal plane level (local, pixel level processing) would be faster, permitting image correction and improving image quality. Local processing would also reduce system power consumption and improve throughput.

An interesting aspect of the development of active pixels is that the smallest practical pixel size is limited by physical principles (vibration and the diffraction limited resolution, which is a function of wavelength and aperture size), while the feature size of the active transistors continues to shrink. This is in contrast to devices such as memory cells, wherein the cell size shrinks with the feature size so that the number of transistors per cell remains fixed. This feature of active pixel sensors means that the number of transistors which may be incorporated into each active pixel will continue to increase as the smallest feature size continues to decrease. This permits the use of focal plane level image processing, wherein processing capability is incorporated at the pixel level in the form of additional transistors.

What is desired is a structure for an active pixel image cell which includes an embedded neuron transistor to permit focal plane level image processing for neural network applications. These and other advantages of the present invention will be apparent to those skilled in the art upon a reading of the Detailed Description of the Invention together with the drawings.

SUMMARY OF THE INVENTION

The present invention is directed to an active pixel image cell which includes a photosensor, active devices for control of the sensor and readout of a signal representing the intensity of light to which the sensor is exposed, and a neuron MOSFET transistor capable of simulating the behavior of a human neuron. An integrated neural network and imaging array may be formed by interconnecting a group of such pixels. Various digital signal processing algorithms used for image processing may be implemented at the pixel level by appropriate interconnections between the output signals from the photosensors of surrounding pixels and the neuron MOSFET.

Further objects and advantages of the present invention will become apparent from the following detailed description and accompanying drawings.

DETAILED DESCRIPTION OF THE INVENTION

Figure 1:
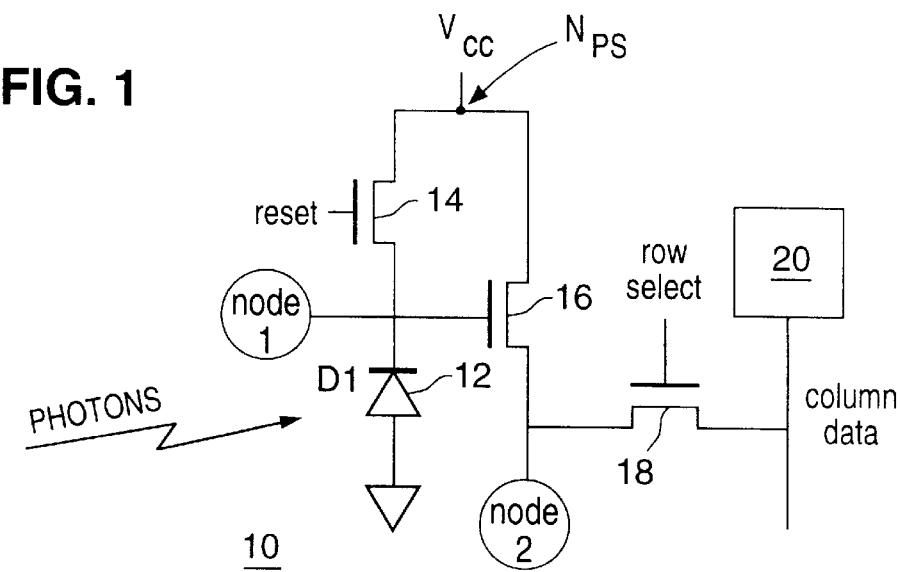
FIG. 1 shows an example of a conventional CMOS active pixel sensor cell.
Figure 2:
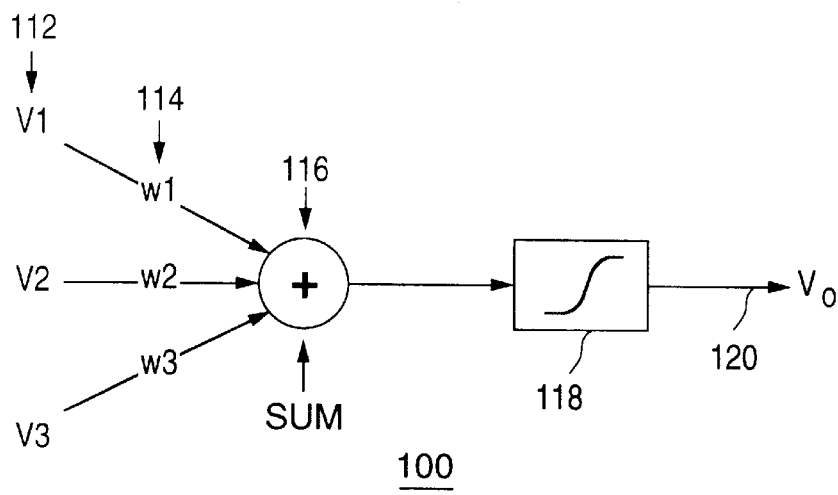
FIG. 2 shows a model for a human neuron.
Figure 3:
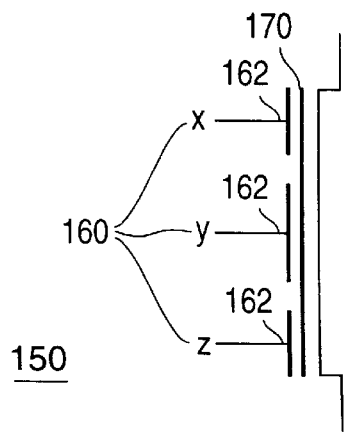
FIG. 3 shows the symbol for a three input floating gate MOSFET which may be used to implement the human neuron model of FIG. 2.

FIG. 3 shows the symbol for a three input floating gate MOSFET 150 which may be used to implement the human neuron model of FIG. 2. As shown in the figure, MOSFET 150, termed a νMOS transistor, has three inputs (labelled "x", "y", and "z" in the figure) 160 which are connected to input gates 162. Input gates 162 are capacitively coupled to floating gate 170 of νMOS 150, with coupling coefficients given by K1, K2, and K3, respectively. The potential of floating gate 150 is determined via capacitive coupling with input gates 162. When the potential of floating gate 170 is less than the threshold voltage of transistor 150 as seen from gate 170, the νMOS is "off". This corresponds to the situation in which the neuron does not fire. When the potential of floating gate 170 is greater than the threshold voltage of transistor 150 as seen from gate 170, the νMOS is "on". This corresponds to the situation in which the neuron fires. When νMOS 150 is on, the output current is described by the expression shown in FIG. 3, i.e., Output=$f(xK1+yK2+zK3)$, where the function f represents the thresholding operation of the transistor. Note that the values of the capacitive coupling coefficients may be set as desired to provide the relative weightings between the inputs required for implementation of a specific processing algorithm.

Figure 4:
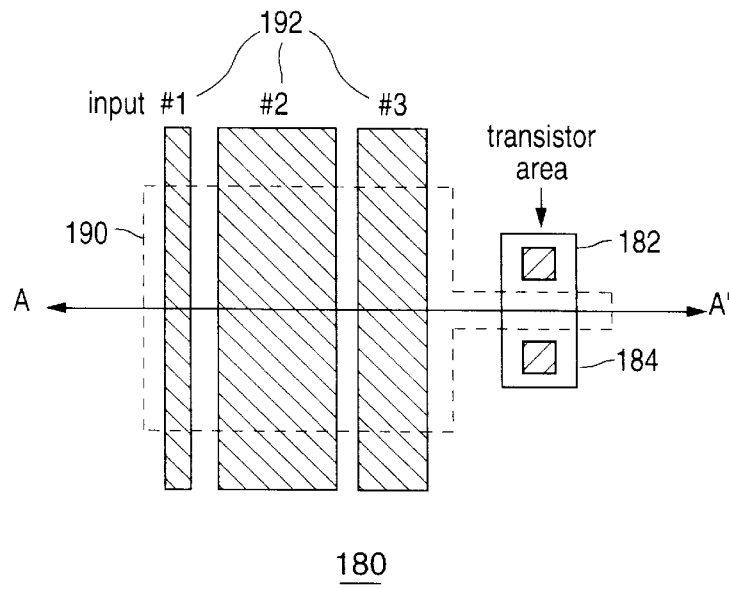
FIG. 4 shows a plan view of a νMOS transistor which implements the model of the human neuron of FIG. 2.

FIG. 4 shows a plan view of a vMOS transistor 180 which implements the model of the human neuron of FIG. 2. vMOS transistor 180 includes source 182 and drain 184 regions which are formed in a lightly-doped substrate, and a layer of gate oxide (not shown) which is formed over a channel region defined between the source and drain regions.

vMOS transistor 180 also includes a floating gate 190 which is formed over the layer of gate oxide and a layer of interpoly dielectric (not shown) which is formed over floating gate 190. A series of spaced-apart input gates 192 are formed over the layer of interpoly dielectric. Although three such input gates are shown in FIGS. 3 and 4, it is possible to implement the vMOS transistor in a form which has a greater or lesser number of inputs.

In operation, the voltages applied to input gates 192 are capacitively coupled to floating gate 190 which causes transistor 180 to turn on when the potential on floating gate 190 is sufficient to form a conducting channel underneath the layer of gate oxide (and appropriate voltages are applied to the source and drain regions).

The potential on floating gate 190 is defined by the linear sum of all the voltages applied to input gates 192 as weighted by the corresponding capacitive coupling coefficients between the input gates and the floating gate. The relative weighting of the capacitive coupling coefficients is determined by the area consumed by each of the input gates.

As a result, floating gate 190 calculates the weighted sum of each of the input voltages, and then turns on transistor 180 when the weighted sum exceeds the turn-on potential of floating gate 190. By responding to a weighted sum in this manner, vMOS transistor 180 resembles a biological neuron that "fires" in response to different multiple-input conditions.

Figure 5:
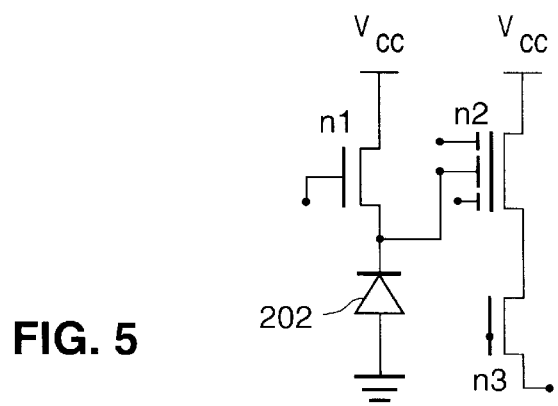
FIG. 5 is a schematic diagram showing the elements of a three input neural network active pixel of the present invention.

FIG. 5 is a schematic diagram showing the elements of a three input neural network active pixel 200 of the present invention. Active pixel cell 200 includes a photodiode (or other photosensor) 202 and transistors n1 and n3 which control the reset operation of the pixel (n1) and act to produce a signal representing the "neural" output of the pixel (n3). However, in accordance with the present invention, pixel 200 also includes vMOS transistor n2, which is shown as a three-input floating gate MOSFET in the figure. "The vMOS transistor is capable of accepting signals directly from the photosensor 202 without intervening buffering or amplification." As shown, the output of photosensor 202 forms one of the inputs to vMOS transistor n2, with the other two inputs being provided by output signals from the photosensors of other pixels in an imaging array. The output of pixel 200 is provided as an output from transistor n3. The output from photosensor 202 of each pixel may be provided as an input to both its own neural network transistor and to that of two adjacent pixels (in the case of a three input vMOS transistor), with the connections and relative weightings between the three inputs depending upon the signal processing algorithm being implemented.

Figure 6:
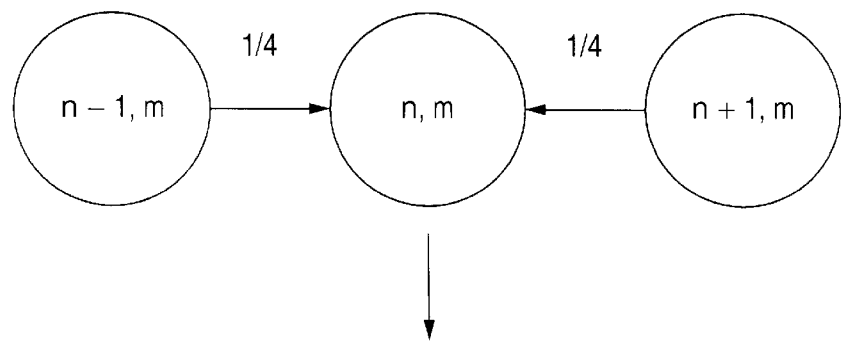
FIG. 6 is a diagram showing how the neural network active pixels of FIG. 5 may be interconnected to form a neural net which implements a local image processing algorithm for reducing aliasing at the focal plane.

FIG. 6 is a diagram showing how neural network active pixels of the type shown in FIG. 5 may be interconnected to form a neural net which implements a local image processing algorithm for reducing aliasing at the focal plane. As shown in the figure, each pixel (labelled with indices [n,m] in the figure) is interconnected to a pixel in each of two adjacent rows or columns (corresponding to indices [n−1,m] and [n+1,m]). The interconnections are made in a manner such that the relative weighting of the output signals is ¼ for each of the adjacent pixels and ½ for the central [n,m] pixel. Thus, the output of pixel [n,m] is given by the expression:

$$\text{Output} = \tfrac{1}{4}[n-1,m] + \tfrac{1}{2}[n,m] + \tfrac{1}{4}[n+1,m]$$

This signal processing algorithm acts as a low pass filter to band limit the spatial frequency of the signals to less than the Nyquist sampling frequency. This provides a reduction in aliasing for the output signals.

Figure 7:
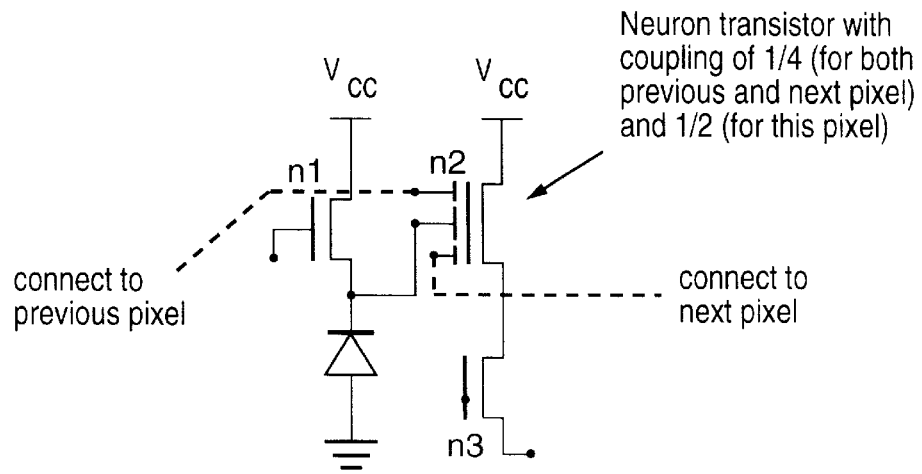
FIG. 7 is a schematic diagram showing in greater detail how the neural network active pixel of FIG. 5 may be interconnected to adjacent pixels to implement the algorithm of FIG. 6.

FIG. 7 is a schematic diagram showing in greater detail how the neural network active pixel of FIG. 5 may be interconnected to adjacent pixels to implement the algorithm of FIG. 6. As shown in the figure, one of the three inputs to vMOS transistor n2 is provided by the output of the photosensor of the previous pixel, a second input is provided by the output of the photosensor of the present pixel, and the third input is provided by the output of the photosensor of the next pixel. By causing the relative coupling coefficients of the three inputs to be ¼, ½, and ¼, respectively, the algorithm of FIG. 6 may be implemented at the pixel (focal plane) level.

Figure 8:
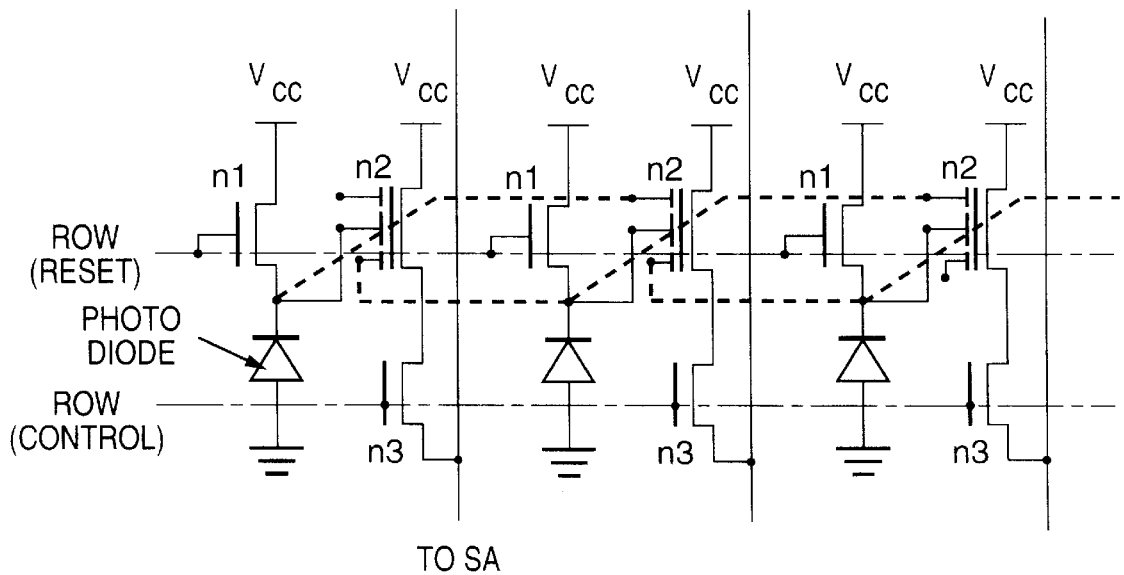
FIG. 8 is a schematic showing how the neural network active pixels of FIG. 5 may be interconnected to form an imaging array.

FIG. 8 is a schematic showing how the three input neural network active pixels of FIG. 5 may be interconnected to form an imaging array. The figure shows a section of such an array containing three neural network active pixels. As shown in the figure, the interconnections between the pixels in a row are the same as shown in FIG. 7. That is, one of the three inputs to each vMOS transistor n2 is provided by the output of the photosensor of the pixel in the same row but the previous column, a second input is provided by the output of the photosensor of the present pixel, and the third input is provided by the output of the photosensor of the pixel in the same row but the next column. The output of each pixel is provided on the column line connected to the output of each transistor n3 (labelled "To SA" in the figure). Note that although the interconnections between adjacent pixels shown in FIG. 8 are the same as those shown in FIG. 7, the signal processing algorithm implemented by the array of FIG. 8 will not necessarily be the same as that of FIG. 7. This is because the algorithm depends upon the relative weightings for each of the interconnections. This is turn depends upon the capacitive coupling coefficients between each of the inputs gates and the underlying floating gate for the neural net transistors.

Figure 9:
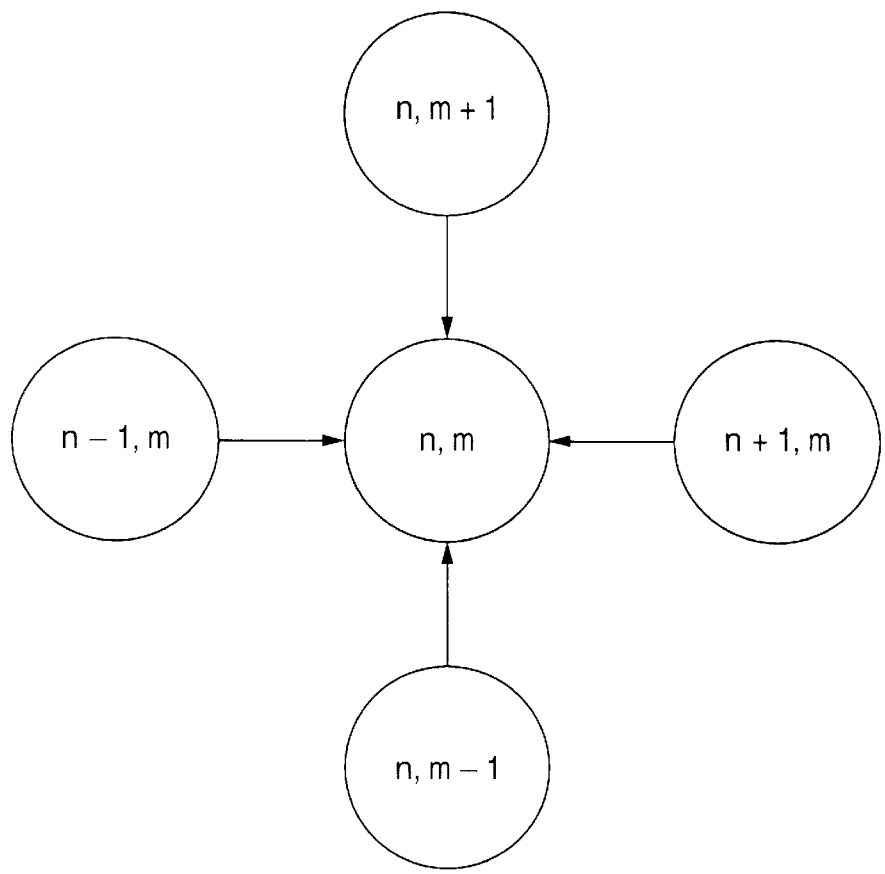
FIG. 9 is a diagram showing how the neural network active pixels of the present invention may be interconnected to implement an algorithm to cancel anomalous pixels at the focal plane.

FIG. 9 is a diagram showing how a group of four input neural network active pixels of the present invention may be interconnected to implement an algorithm to cancel anomalous pixels at the focal plane. The design of the pixel, which will be described in greater detail later, includes having two outputs in order to efficiently implement the algorithm. As shown in the figure, each pixel (labelled with indices [n,m] in the figure) is interconnected to each of the four adjacent pixels (corresponding to indices [n−1,m], [n+1,m], [n,m+1], and [n,m−1]). The interconnections are made in a manner such that the relative weighting is ¼ for the output signals of the photosensors of each of the adjacent pixels. Thus, a first output of pixel [n,m] is given by the expression:

$$\text{Output}_1 = \tfrac{1}{2}\{([n, m+1]+[n,m-1])/2 + ([n-1,m]+[n+1,m])/2\}$$

This represents a two dimensional average of the outputs of the photosensors of the four pixels surrounding the central pixel [n,m]. If the normal output of the pixel [n,m] (i.e., the signal produced by the photosensor within the pixel) is provided as the second output of the pixel (Output$_2$), then a comparator or processor can perform an operation which will serve to identify anomalous pixels and replace the output value(s) of such pixels with that of the surrounding two dimensional average. For example, if Output, and Output$_2$ are provided as inputs to a comparator, then a suitable algorithm is if Output$_2$>2*Output$_1$ or if Output$_2$<Output$_1$/2, then set Output$_2$=Output$_1$ otherwise use Output$_2$ as pixel output.

Figure 10:
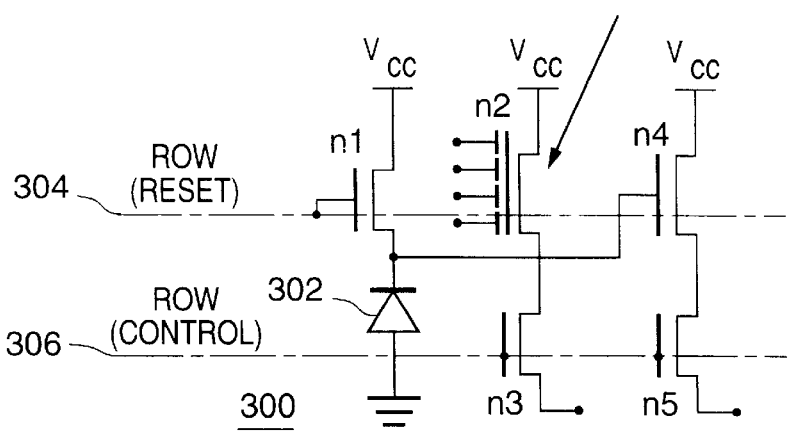
FIG. 10 is a schematic of a four input neural network active pixel of the present invention which may be used to implement the algorithm of FIG. 9.

FIG. 10 is a schematic of a four input neural network active pixel 300 of the present invention which may be used to implement the algorithm of FIG. 9. As shown in the figure, each pixel 300 includes a photosensor 302 and transistors n1, . . . , n5. Transistor n1 is used to reset the pixel by connecting photosensor 302 to Vcc upon application of a reset pulse to row reset line 304. Transistors n4 and n5 are used to provide a first pixel output (termed Output$_2$ above) upon application of an appropriate pulse to row control line 306. This output is the normal pixel output, representing the integrated signal on photosensor 302. However, in accordance with the present invention, pixel 300 includes four input neural network transistor n2. Each of the four inputs to transistor n2 is weighted with a coupling coefficient of ¼, and connected to the output node of the photosensor of each of the four surrounding pixels. A pulse applied to row control line 306 operates transistor n3 and causes the two dimensional average of the surrounding pixels to be available as the output of transistor n3, i.e., the second output of pixel 300 (termed Output$_1$ above). A column sensing circuit or other form of comparator (located within or external to the pixel itself) may then be used to compare the two outputs from each pixel and eliminate anomalous signals arising from pixel defects.

Figure 11:
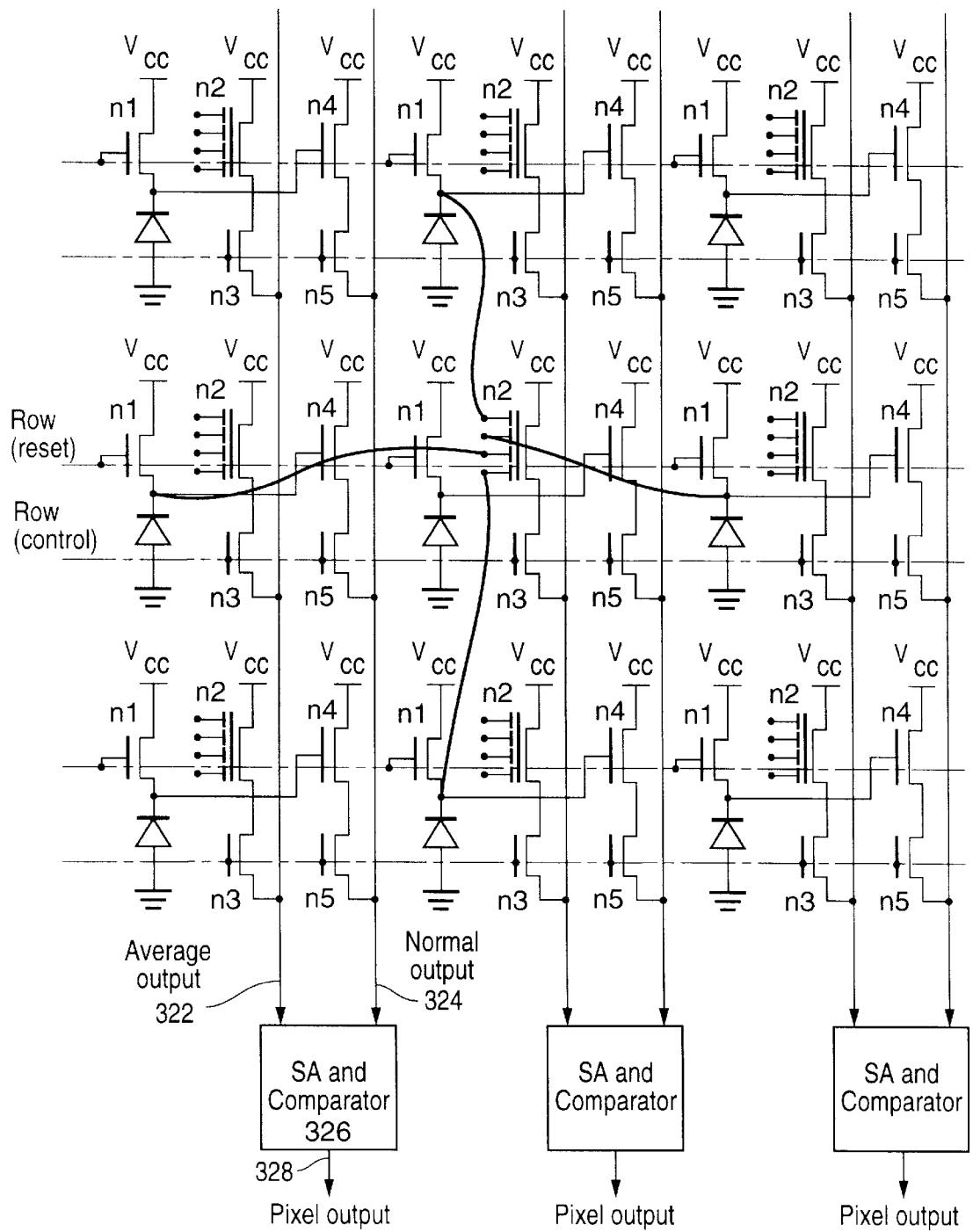
FIG. 11 is a schematic showing how the four input neural network active pixel of FIG. 10 may be interconnected to four surrounding pixels in an imaging array.

FIG. 11 is a schematic showing how the four input neural network active pixel of FIG. 10 may be interconnected to each of four surrounding pixels in an imaging array 320. As shown in the figure, the four inputs to the neural network transistor n2 are provided by the outputs of each of the photosensors of the four surrounding pixels. Each pixel is connected to two output lines (column lines in the figure), one for reading out the two dimensional average of the four surrounding pixels 322 (labelled "Average output" in the figure), and a second output line 324 for reading out the usual output of the pixel (labelled "Normal output" in the figure). The signals on output lines 322 and 324 are provided as inputs to a sense amplifier and comparator circuit 328 connected to each column of pixels in array 320. As noted, circuit 328 is responsible for providing the final pixel output 328 after performing the appropriate comparison of the two input signals.

Figure 12:
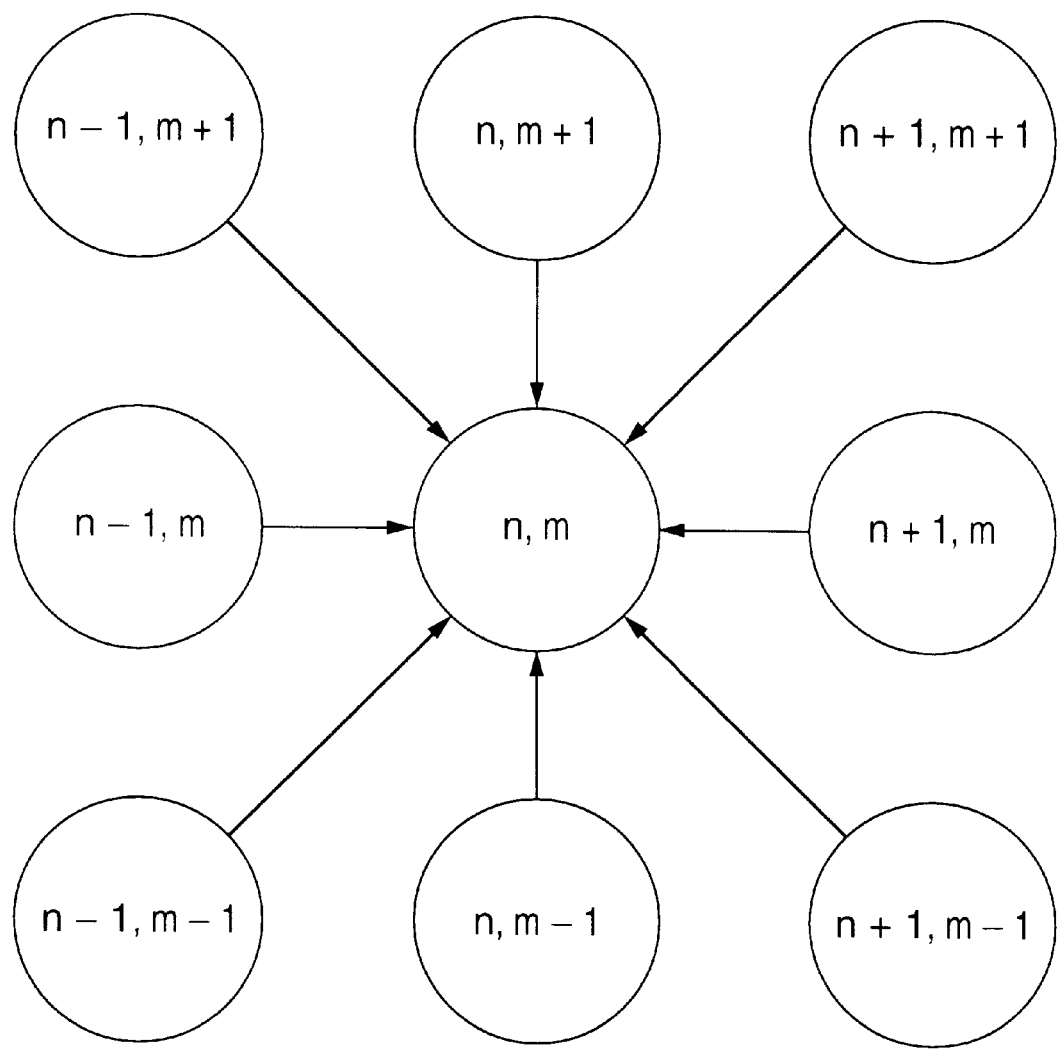
FIG. 12 is a diagram showing how a neural network active pixel cell of the present invention may be interconnected with its nearest neighbors to form a general neural network.

FIG. 12 is a diagram showing how a neural network active pixel cell of the present invention may be interconnected with its nearest neighbors to form a general neural network. Such a neural network would typically utilize active pixels which include an eight input neural transistor and coupling coefficients of ⅛ for each input. A neural transistor having a fewer number of inputs could be used if it was desired to "hard wire" a correlation between certain of the inputs.

Although two examples of possible digital signal processing algorithms capable of being implemented by the neural network active pixel cell of the present invention have been described, other types of algorithms may also be implemented. These include algorithms for edge sharpening, local gamma correction, and programmable dynamic range. Each of these algorithms can be implemented in real time at the focal plane level by using embodiments of the present invention.

An active pixel image cell which includes a neural network transistor has been described. The incorporation of such a transistor into each pixel permits processing algorithms to be implemented in real time at the pixel level. This reduces the image processing time, allowing fast correction of video images and improving the image quality. The present invention also reduces the system power consumption and frees the system processor from having to control the signal processing operations at the pixel level.

Although examples of active pixels which include three input and four input neural transistors have been described, it is to be understood that the present invention is not limited to such embodiments. Other numbers of inputs, other relative coupling coefficients between the inputs, and other interconnections between pixels' photosensors and neural transistors, aside form those explicitly mentioned, may be used. This permits the implementation of a wide variety of signal processing algorithms at the pixel level.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. An imaging array, comprising:
   a plurality of active pixel imaging cells arranged into rows and columns, wherein each active pixel imaging cell further comprises
      a sensor which detects photons and responds by generating an electrical signal representing an output of the sensor;
      a neuron MOSFET transistor having a plurality of inputs, with one of the inputs being the output of the sensor, the remaining inputs being the outputs of sensors contained in other pixels of the array, and an output representing a thresholded weighted sum of the inputs; and
      a control element for providing the output of the neuron MOSFET transistor as an output of the active pixel imaging cell.

2. The imaging array of claim 1, further comprising:
   a column line selectively connected to an output node of each of the neuron MOSFET transistors contained in the pixels in a column of the array.

3. The imaging array of claim 1, wherein each neuron MOSFET transistor has three inputs.

4. An imaging array that includes a plurality of active pixel imaging cells arranged in rows and columns, each active pixel imaging cell comprising:
   a sensor that detects photons incident on the sensor and generates a sensor output signal representing cumulative photons detected by the sensor during a predefined time period;
   a neuron MOSFET transistor having three inputs, one of the inputs being the sensor output signal, said input having a coupling coefficient of ½, the remaining two inputs being the outputs of sensors contained in other pixel image cells of the array and said remaining two inputs having coupling coefficients of ¼, and an output representing a threshold weighted sum of the inputs; and
   a control element for providing the output of the neuron MOSFET transistor as an output of the active pixel imaging cell.

5. An imaging array, comprising:
   a plurality of active pixel imaging cells arranged into rows and columns, wherein each active pixel imaging cell further comprises a sensor which detects photons and responds by generating an electrical signal representing an output of the sensor; and a neuron MOSFET transistor having a plurality of inputs, with the inputs being the outputs of sensors contained in other pixels of the array, and an output representing a thresholded weighted sum of the inputs;

a first output node for providing a first pixel output corresponding to the output of the sensor; and a second output node for providing a second pixel output corresponding to the output of the neuron MOSFET transistor.

6. The imaging array of claim 5, further comprising:

a first column line electrically connected to the first output node of each of the pixels in a column of the array; and a second column line electrically connected to the second output node of each of the pixels in a column of the array.

7. The imaging array of claim 6, further comprising:

a signal processing element having signals provided by the first and second column lines as inputs and an output representing a final output of the pixel.

8. The imaging array of claim 5, wherein each neuron MOSFET transistor has four inputs.

9. An imaging array that includes a plurality of active pixel imaging cells arranged in rows and columns, each active pixel imaging cell comprising:

a sensor that detects photons incident on the sensor and generates a sensor output signal representing cumulative photons detected by the sensor during a predefined time period;

a neuron MOSFET transistor having a plurality of inputs, the inputs being the outputs of sensors contained in other pixel imaging cells of the array, and an output representing a threshold weighted sum of the inputs;

a first output node for providing a first pixel output corresponding to the output of the sensor;

a second output node for providing a second pixel output corresponding to the output of the neuron MOSFET transistor;

a first column line electrically connected to the first output node of each of the pixels in a column array;

a second column line electrically connected to the second output node of each of the pixels in a column array; and a signal processing element having signals provided by the first and second column lines as inputs and an output representing a final output of the pixel, wherein the signal processing element implements the algorithm if $Output_2 > 2*Output_2$ or if $Output_2 < Output_1/2$ then set $Output_2 = Output_1$ otherwise use $Output_2$ as the final pixel output, where $Output_2$ is a signal provided by the first column line and $Output_1$ is a signal provided by the second column line.

10. An active pixel imaging cell, comprising:

a sensor which detects photons and responds by generating an electrical signal representing an output of the sensor;

a neuron MOSFET transistor, having a plurality of inputs, with one of the inputs being the output of the sensor, and an output representing a thresholded weighted sum of the inputs; and a control element for providing the output of the neuron MOSFET transistor as an output of the active pixel imaging cell.

\* \* \* \* \*

UNITED STATES PATENT AND TRADEMARK OFFICE
CERTIFICATE OF CORRECTION

PATENT NO. : 6,011,295
DATED : January 4, 2000
INVENTOR(S) : RICHARD BILLINGS MERRILL et al.

It is certified that error appears in the above-identified patent and that said Letters Patent is hereby corrected as shown below:

In The Claims:

Claim 9, page 10, line 17, after "*" please delete

"$Output_2$" and substitute therefor --$Output_1$--.

Signed and Sealed this

First Day of August, 2000

Q. TODD DICKINSON

Attest:

Attesting Officer

Director of Patents and Trademarks